(12) United States Patent  (10) Patent No.: US 7,987,295 B2
Tanaka  (45) Date of Patent: Jul. 26, 2011

(54) INFORMATION PROCESSING DEVICE, INFORMATION PROCESSING METHOD AND INFORMATION MANAGEMENT SYSTEM

(75) Inventor: Dai Tanaka, Shiojiri (JP)

(73) Assignee: Seiko Epson Corporation (JP)

( * ) Notice: Subject to any disclaimer, the term of this patent is extended or adjusted under 35 U.S.C. 154(b) by 473 days.

(21) Appl. No.: 12/212,899

(22) Filed: Sep. 18, 2008

(65) Prior Publication Data

US 2009/0083469 A1  Mar. 26, 2009

(30) Foreign Application Priority Data

Sep. 21, 2007 (JP) ................................ 2007-244902
Sep. 9, 2008 (JP) ................................ 2008-230610

(51) Int. Cl.
  *G06F 13/00*  (2006.01)
(52) U.S. Cl. .......................... 709/250; 709/205; 709/219
(58) Field of Classification Search .................. 709/204, 709/205, 217, 219, 223, 224, 250
  See application file for complete search history.

(56) References Cited

U.S. PATENT DOCUMENTS

| 7,801,905 B1* | 9/2010 | Singh et al. .................. 707/758 |
| 2006/0193283 A1* | 8/2006 | Harris et al. .................. 370/328 |
| 2007/0250531 A1* | 10/2007 | Wiggins et al. ............... 707/102 |

FOREIGN PATENT DOCUMENTS

| JP | 2001-222525 | 8/2001 |
| JP | 2002-132774 | 5/2002 |
| JP | 2005-222468 | 8/2005 |

* cited by examiner

*Primary Examiner* — Viet Vu
(74) *Attorney, Agent, or Firm* — Harness, Dickey & Pierce, P.L.C.

(57) ABSTRACT

An information processing device according the invention includes: a first interface used for communication via a network; a second interface used for communication with an information display device; an identifier acquisition unit that acquires an identifier specifying the information display device; an address storage unit that stores an address indicating location of a management device on the network; a mode information acquisition unit that acquires mode information indicating whether an operation mode of the information display device specified by the identifier acquired by the identifier acquisition unit is a server-linked mode or a stand-alone mode; a first transmission unit that transmits a request including a request to transmit management information specifying a content displayed in the information display device and the identifier, to the management device via the first interface when the mode information indicates the server-linked mode; a first receiving unit that receives the management information transmitted from the management device in response to the request transmitted by the first transmission unit, via the first interface; a second transmission unit that transmits a request to transmit the management information, to the information display device via the second interface when the mode information indicates the stand-alone mode; and a second receiving unit that receives the management information transmitted from the information display device in response to the request transmitted by the second transmission unit, via the second interface.

10 Claims, 10 Drawing Sheets

INFORMATION PROCESSING DEVICE, INFORMATION PROCESSING METHOD AND INFORMATION MANAGEMENT SYSTEM

BACKGROUND

1. Technical Field

The present invention relates to a technique of managing information including documents and images.

2. Related Art

An information management system using an information display device called electronic book or electronic paper is known. In the information management system of this type, a technique of managing information by using a network is known in response to requests by plural users to share information or to browse information at different places in an office.

JP-A-2001-222525 discloses a mechanism of collectively storing confidential documents of a corporation by using a server device managed by an external company which has signed up a contract with that corporation. JP-A-2002-132774 discloses a user-participation electronic book publication system. With this system, a user can edit electronic book data existing in a host computer. The edited data is distributed to other users as well. Plural users can thus share the data. JP-A-2005-222468 discloses a content editing system. With this system, a content is produced by a privileged user as a chief editor and other users.

For all the techniques described in JP-A-2001-222525, JP-A-2002-132774 and JP-A-2005-222468, accessibility by the information display device to the server such as the host computer connected to the network is a prerequisite. That is, in an environment where the information display device cannot access the server, browsing, editing and operation of information cannot be carried out.

SUMMARY

The invention provides a technique that enables processing such as browsing of information to be carried out even when there is no access to the network, that is, a technique of changing the acquisition source of management information in accordance with the status of the information display device.

An information processing device according an aspect of the invention includes: a first interface used for communication via a network; a second interface used for communication with an information display device; an identifier acquisition unit that acquires an identifier specifying the information display device; an address storage unit that stores an address indicating location of a management device on the network; a mode information acquisition unit that acquires mode information indicating whether an operation mode of the information display device specified by the identifier acquired by the identifier acquisition unit is a server-linked mode or a stand-alone mode; a first transmission unit that transmits a request including a request to transmit management information specifying a content displayed in the information display device and the identifier, to the management device via the first interface when the mode information indicates the server-linked mode; a first receiving unit that receives the management information transmitted from the management device in response to the request transmitted by the first transmission unit, via the first interface; a second transmission unit that transmits a request to transmit the management information, to the information display device via the second interface when the mode information indicates the stand-alone mode; and a second receiving unit that receives the management information transmitted from the information display device in response to the request transmitted by the second transmission unit, via the second interface.

With the above configuration, the acquisition source of management information is switched in accordance with the operation mode of the information display device.

The information processing device according to the aspect of the invention includes: a third transmission unit that transmits a request to change the operation mode of the information display device to the server-lined mode, to the information display device via the second interface; a third receiving unit that receives a response including the management information transmitted from the information display device in response to the request transmitted by the third transmission unit, via the second interface; and a fourth transmission unit that transmits the management information included in the response received by the third receiving unit and the identifier to the management device via the first interface.

With the above configuration, when the operation mode is to be changed to the server-linked mode, the management information acquired from the information display device is transmitted to the management device.

The information processing device according to the aspect of the invention includes: a fifth transmission unit that transmits a request to change the operation mode of the information display device to the stand-alone mode to the information display device via the second interface; and a sixth transmission unit that transmits the identifier to the management device via the first interface.

With the above configuration, when the operation mode is to be changed to the stand-alone mode, the identifier of the information display device is transmitted to the management device.

In the information processing device according to the aspect of the invention, the mode information acquisition unit acquires the mode information from the information display device or the management device when communication with the information display device is possible, and the mode information acquisition unit acquires the mode information from the management device when communication with the information display device is not possible.

With the above configuration, when communication with the information display device cannot be carried out, the mode information is acquired from the management device.

The information processing device according to the aspect of the invention includes: an editing unit that edits the management information; a seventh transmission unit that transmits the management information edited by the editing unit to the management device via the first interface when the mode information indicates the server-linked mode; and an eighth transmission unit that transmits the management information edited by the editing unit to the information display device via the second interface when the mode information indicates the server-linked mode or when the mode information indicates the stand-alone mode.

With the above configuration, when the management information is edited, the edited management information is transmitted to the management device and the information display device in the server-linked mode, and to the information display device in the stand-alone mode.

In the information processing device according to the aspect of the invention, the management device, the information processing device and the information display device process the management information in different formats from each other. The information processing device has a conversion unit that converts the format of the management information in accordance with a transmission destination before transmitting the management information to the management device or the information display device.

With the above configuration, the format of the management information is converted in accordance with the transmission destination.

An information processing method according to another aspect of the invention is an information processing method in an information processing device including a first interface used for communication via a network, a second interface used for communication with an information display device, and an address storage unit that stores an address indicating location of a management device on the network. The method includes: acquiring an identifier specifying the information display device; storing an address indicating location of the management device on the network into the storage unit; acquiring mode information indicating whether an operation mode of the information display device specified by the identifier is a server-linked mode or a stand-alone mode; transmitting a first request including a request to transmit management information specifying a content displayed in the information display device and the identifier, to the management device via the first interface when the mode information indicates the server-linked mode; receiving the management information transmitted from the management device in response to the first request, via the first interface; transmitting a second request to transmit the management information, to the information display device via the second interface when the mode information indicates the stand-alone mode; and receiving the management information transmitted from the information display device in response to the second request, via the second interface.

In the information processing method according to the aspect of the invention, in the acquisition of the mode information, the mode information is acquired from the information display device or the management device when communication with the information display device is possible, and the mode information is acquired from the management device when communication with the information display device is not possible.

An information management system according to still another aspect of the invention includes: a management device; plural information processing devices capable of communicating with the information processing device via a network; and plural information display devices. Each of the plural information processing devices includes: a first interface used for communication via the network; a second interface used for communication with the information display devices; an identifier acquisition unit that acquires an identifier specifying a target information display device to be a communication target, of the plural information display devices; an address storage unit that stores an address indicating location of a management device on the network; a mode information acquisition unit that acquires mode information indicating whether an operation mode of the target information display device is a server-linked mode or a stand-alone mode; a first transmission unit that transmits a request including a request to transmit management information specifying a content displayed in the target information display device and the identifier, to the management device via the first interface when the mode information indicates the server-linked mode; a first receiving unit that receives the management information transmitted from the management device in response to the request transmitted by the first transmission unit, via the first interface; a second transmission unit that transmits a request to transmit the management information, to the target information display device via the second interface when the mode information indicates the stand-alone mode; a second receiving unit that receives the management information transmitted from the target information display device in response to the request transmitted by the second transmission unit, via the second interface; a fifth transmission unit that transmits a request to change the operation mode of the target information display device to the stand-alone mode to the target information display device via the second interface; and a sixth transmission unit that transmits the identifier to the management device via the first interface. The management device includes: a database in which plural data sets are stored including an identifier specifying one information display device of the plural information display devices and management information corresponding to the one information display device; a fourth receiving unit that receives the identifier transmitted by the sixth transmission unit; and a use suspension unit that disables use of management information corresponding to the identifier received by the fourth receiving unit.

In the information management system according to the aspect of the invention, the mode information acquisition unit acquires the mode information from the information display device or the management device when communication with the information display device is possible, and the mode information acquisition unit acquires the mode information from the management device when communication with the information display device is not possible.

With the above configuration, when the operation mode of the information display device turns to the stand-alone mode, the management information stored in the management device can no longer be used.

DESCRIPTION OF EXEMPLARY EMBODIMENTS

1. Configuration

Figure 1:
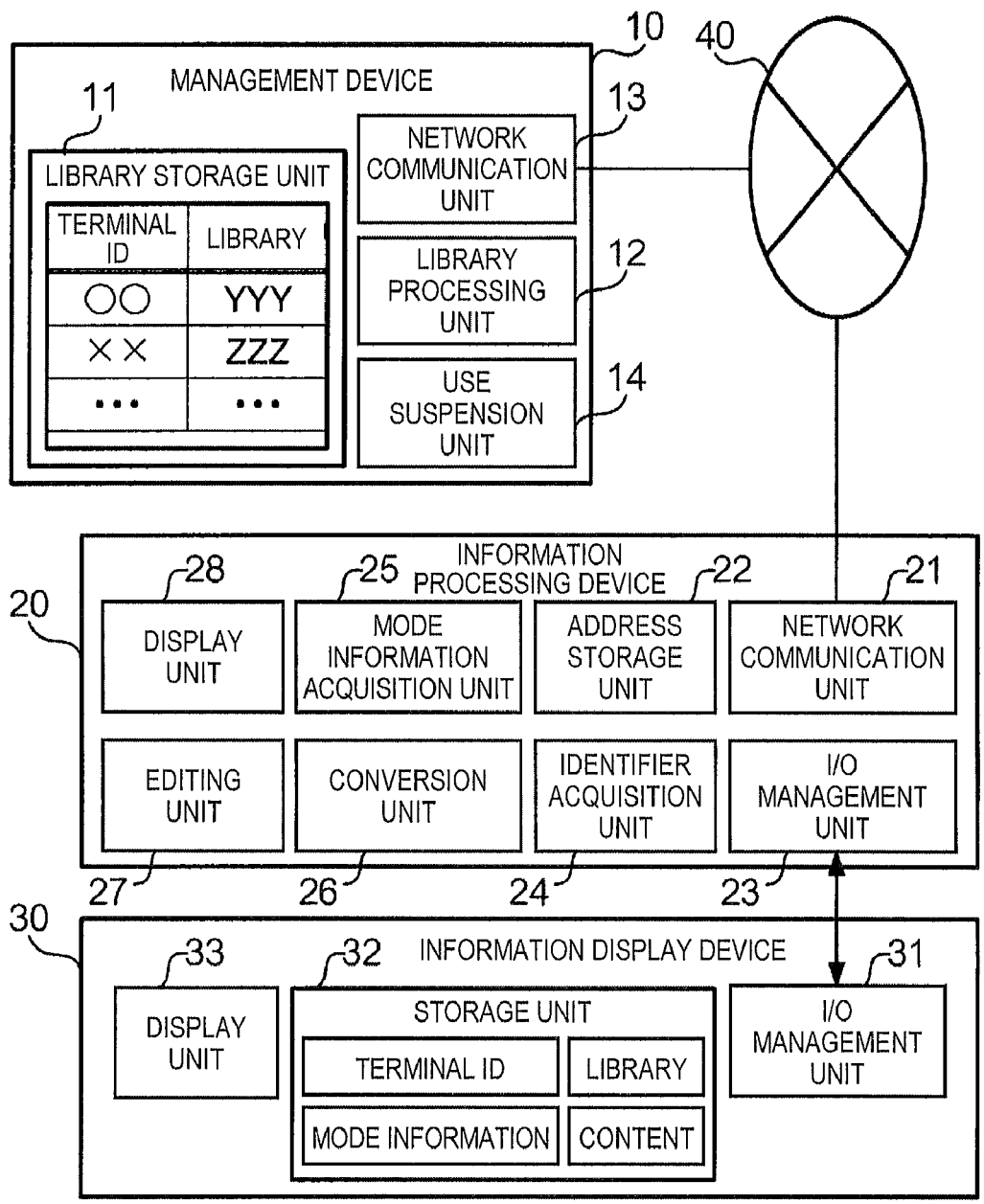
FIG. 1 is a view showing the functional configuration of an information management system 1 according to an embodiment.

FIG. 1 is a view showing the functional configuration of an information management system 1 according to an embodiment. The information management system 1 includes one management device 10, plural information processing devices 20, and plural information display devices 30. The information management system 1 is used, for example, in the following manner. The management device 10 and the information processing devices 20 are shared by plural users. A certain information display device 30 is exclusively possessed by a certain user. By connecting his/her own information display device 30 to the information processing devices 20, a user can use information provided for shared use by the management device 10, or can provide the information stored in his/her information display device 30 for shared use. In FIG. 1, one each of the information processing devices 20 and the information display devices 30 is shown in order to simplify the drawing.

The management device 10 and the information processing device 20 are connected via a network 40. The information display device 30 operates in two operation modes, that is, a server-linked mode or a stand-alone mode. These operation modes will be described later in detail.

Here, the management device 10 is a device that manages information, that is a library in this case. A library storage unit 11 stores a database in which a library (management information) related to a content displayed in the information display device 30 is registered. "Content" refers to data including information such as a document or image, or information represented by the data. A content is a data file converted to a data format compatible with the information display device 30 from a file of a specific format created by specific software, for example, a data file described in a format readable by specific software such as Microsoft's document creation software Word (trademark registered), spreadsheet software Excel (trademark registered), or presentation software Power Point (trademark registered), PDF format (Portable Document Format), HTML (Hypertext Markup Language) format, or TIFF format (Tagged Image File Format). The data format compatible with the information display device 30 refers to a data format that can be interpreted and displayed by the information display device 30, for example, PDF, PDF subset, or bitmap image.

"Library" refers to information to manage a content. A library includes, for example, meta data related to a content and file subordination information. "Meta data" is information associated with real data of a content file. Meta data includes attributes of a content file, for example, file name (identifier), data type, data size, date and time of creation, creator, and document title of the content file. Meta data may include information added to the content file, for example, messages such as "important", "urgent", "private (personal use)", and "public (shared)" added to the content file by the user, notes, various flags, electronic tags added by the user to a part of the content of the content file. "File subordination information" refers to information representing subordination between plural content files. The file subordination information is equivalent to, for example, "directory" of UNIX (trademark registered) and MS-DOS, or "folder" of Windows (trademark registered) and MacOS (trademark registered).

In a database stored in an auxiliary storage device 130, a library is registered in association with an identifier (terminal ID) that specifies one information display device 30 of the plural information display devices 30. That is, a terminal ID and a library are registered on a one-to-one basis. A library processing unit 12 carries out processing related to the library stored in the library storage unit 11. A network communication unit 13 carries out communication via the network 40. The network communication unit 13 includes an interface that carries out communication via the network and a control unit (fourth receiving unit) that controls the communication. A use suspension unit 14 disables use of the library corresponding to a specific terminal ID in response to a request from the information processing devices 20.

The information processing devices 20 are devices that process information. Since the plural information processing devices 20 have basically the same functions, only one information processing device 20 will be described hereinafter. A network communication unit 21 carries out communication via the network 40. The network communication unit 21 includes an interface (first interface) that carries out communication via the network, and a control unit (first transmission unit, fourth transmission unit, sixth transmission unit, seventh transmission unit, and first receiving unit) that controls the communication. An address storage unit 22 stores an address indicating the location of the management device 10 on the network 40. An I/O management unit 23 carries out communication with other devices such as the information display devices 30. The I/O management unit 23 includes an interface (second interface) that carries out communication with other devices, and a control unit (second transmission unit, third transmission unit, fifth transmission unit, eighth transmission unit, second receiving unit, and third receiving unit) that controls the communication. An identifier acquisition unit 24 acquires an identifier that specifies an information display device 30 to be a processing target, of the plural information display devices 30. Hereinafter, when simply the "information display device 30" is mentioned, the processing target of the plural information display devices 30 is meant. A mode information acquisition unit 25 acquires mode information from the management device 10 or the information display device 30. "Mode information" refers to information indicating the operation mode of the information display device 30.

The management device 10, the information processing device 20 and the information display device 30 process the library in different data formats from each other. A conversion unit 26 converts the format of the library to a format corresponding to a transmission destination before transmitting the library to the management device 10 or the information display device 30. An editing unit 27 edits the library. A display unit 28 displays the library.

The information display device 30 is a device that displays information. An I/O management unit 31 carries out communication with other devices such as the information processing device 20. The I/O management unit 31 includes an interface that carries out communication with other devices and a control unit that control the communication. A storage unit 32 stores various information, for example, the terminal ID, library, content, and mode information of the information display device 30. A display unit 33 displays the library and content.

The network 40 is a communication network including plural communication devices, for example, Internet, LAN (Local Area Network), WAN (Wide Area Network), mobile communication network, or ISDN (Integrated Services Digital Network). The network 40 may partly include a wireless communication section.

Figure 2:
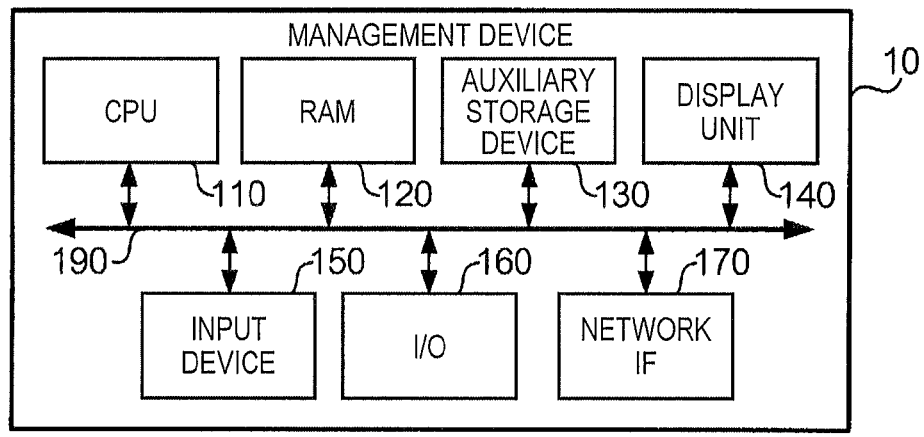
FIG. 2 is a view showing the hardware configuration of a management device 10.

FIG. 2 is a view showing the hardware configuration of the management device 10. The management device 10 is, for example, a server. A CPU (Central Processing Unit) 110 is a control device that controls components of the management device 10. A RAM (Random Access Memory) 120 is a storage device that functions as a work area when the CPU 110 executes a program. An auxiliary storage device 130 is a non-volatile storage device that stores a database in which a library is registered, various data and programs such as a management program, for example, an HDD (Hard Disk Drive) or flash memory. A display unit 140 is a device that displays characters and images, for example, an LCD (Liquid Crystal Display) or CRT (Cathode Ray Tube). An input device 150 is a device for a user to input data and commands to the management device 10, for example, a keyboard and mouse. An I/O 160 is an interface that inputs and outputs data and commands to and from other devices. A network IF 170 is an interface that carries out communication via a network. A bus 190 is a transmission path that transmits data between components. The management device 10 processes the library in a format conforming to the database (hereinafter referred to as "database format").

Figure 3:
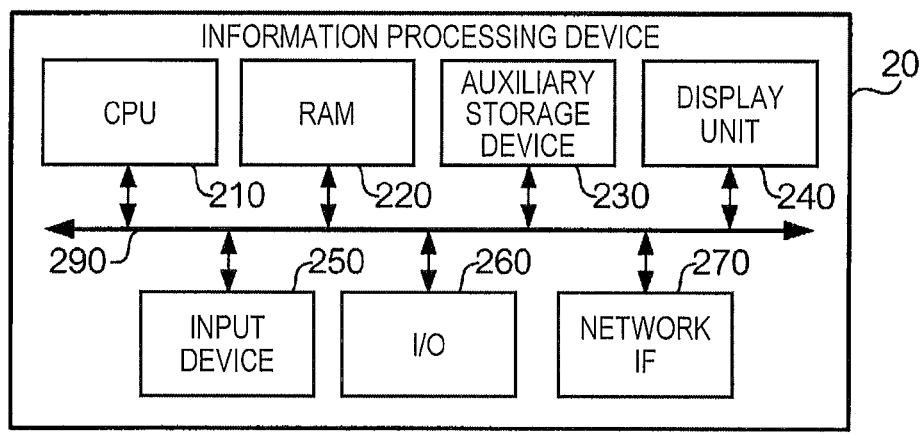
FIG. 3 is a view showing the hardware configuration of an information processing device 20.

FIG. 3 is a view showing the hardware configuration of the information processing device 20. The information processing device 20 is, for example, a personal computer or cellular phone terminal. A CPU 210 is a control device that controls components of the information processing device 20. A RAM 220 is a storage device that functions as a work area when the CPU 210 executes a program. An auxiliary storage device 230 is a non-volatile storage device that stores a library, terminal ID, data such as address of the management device 10 and programs such as a document management control program, for example, an HDD or flash memory. A display unit 240 is a device that displays characters and images, for example, an LCD or CRT. An input device 250 is a device for a user to input data and commands to the information processing device 20, for example, a keyboard and mouse. An I/O 260 is an interface that inputs and outputs data and commands to and from other devices, and includes an interface conforming to a known standard, for example, USB (Universal Serial Bus) 2.0, IrDA (Infrared Data Association) and Bluetooth (trademark registered). A network IF 270 is an interface that carries out communication via a network, and includes an interface conforming to a known standard such as Ethernet (trademark registered). A bus 290 is a transmission path that transmits data between components. The information processing device 20 processes the library in the XML (Extensible Markup Language) format.

Hereinafter, the information processing device 20 carries out communication with the management device 10 via the network IF 270 and the network 40, and communication with the information display device 30 via the I/O 260.

Figure 4:
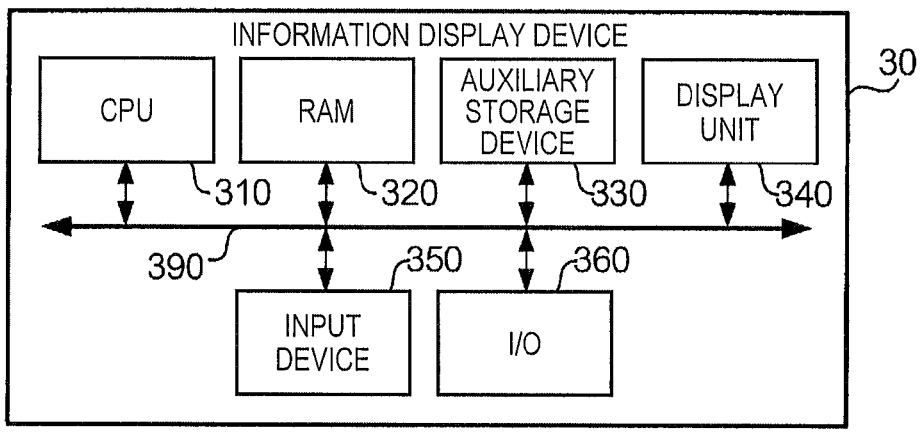
FIG. 4 is a view showing the hardware configuration of an information display device 30.

FIG. 4 is a view showing the hardware configuration of the information display device 30. The information display device 30 is, for example, an electronic paper. Here, "electronic paper" refers to as a device in which its main function is particularly display of information. The electronic paper has a memory-type display body. Here, "memory-type" refers to a property of being able to maintain display without provision of power. It is desirable that the electronic paper is light-weight and thin. Therefore, a simple input device is desirable in order to reduce the size of the device and simplify its configuration. That is, it is preferable that a large input device having many keys such as an alphabetic full-keyboard is not provided.

A CPU 310 is a control device that controls components of the information display device 30. A RAM 320 is a storage device that functions as a work area when the CPU 310 executes a program. An auxiliary storage device 330 is a non-volatile storage device that stores data such as mode information, terminal ID and content, and programs such as a display program, for example, an HDD or flash memory. A display unit 340 is a device that displays characters and images. Here, the display unit 340 is a display body having a memory-type display element, for example, a cholesteric liquid crystal display, EPD (Electrophoresis Display) or electrochromic display. An input device 350 is a device for a user to input data and commands to the information display device 30, for example, a button or dial. An I/O 360 is an interface that inputs and outputs data and commands to and from other devices, and includes an interface conforming to a known standard, for example, USB. A bus 390 is a transmission path that transmits data between components. The information display device 30 processes the library in a format specific to the information display device 30 (hereinafter referred to as "unique format") such as binary format.

The management device 10, the information processing device 20 and the information display device 30 store programs according to this embodiment, respectively. As these programs are executed, the functions shown in FIG. 1 are realized.

2. Operation

2-1. Overall Operation

Figure 5:
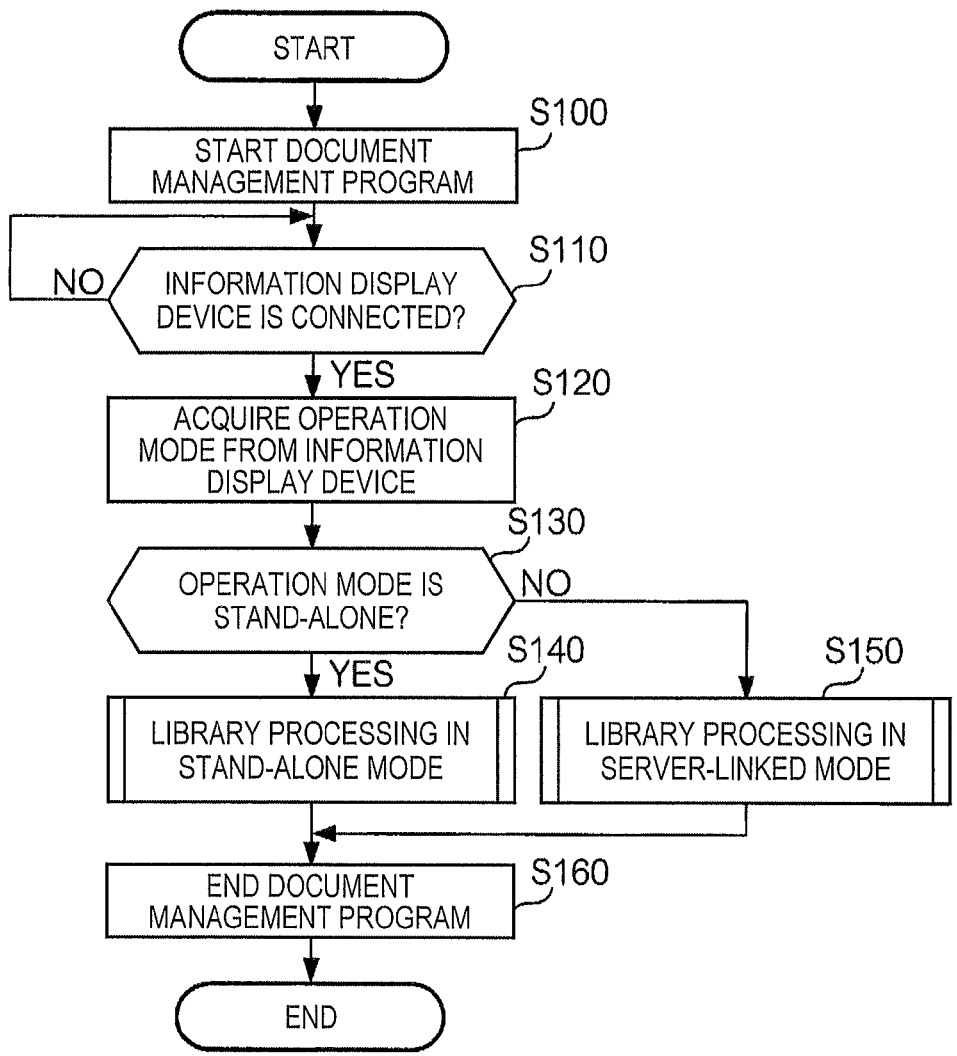
FIG. 5 is a flowchart showing the operation of the information processing device 20.

FIG. 5 is a flowchart showing the operation of the information processing device 20. The flowchart shown in FIG. 5 is started by an instruction to start the document management program by the user operating the input device 250.

In step S100, the CPU 210 starts the document management program.

In step S110, the CPU 210 determines whether the information display device 30 is connected via the I/O 260 or not. If it is determined that the information display device 30 is not connected (NO in step S110), the CPU 210 waits until the information display device 30 is connected. If it is determined that the information display device 30 is connected (YES in step S110), the CPU 210 shifts the processing to step S120.

In step S120, the CPU 210 acquires the operation mode from the information display device 30. Specifically, this is done in the following manner. The CPU 210 transmits an operation mode transmission request to the information display device 30. When the operation mode transmission request is received, the CPU 310 of the information display device 30 reads out the operation mode from the auxiliary storage device 330. The CPU 310 transmits a response including the read-out operation mode to the information processing device 20. When the response is received, the CPU 210 of the information processing device 20 extracts the operation mode from the response. The CPU 210 stores the operation mode in the RAM 220.

In step S130, the CPU 210 decides next processing in response to the operation mode. The CPU 210 determines whether the operation mode is the stand-alone mode or not. If the operation mode is the stand-alone mode (YES in step S130), the CPU 210 shifts the processing to step S140. If the operation mode is the server-linked mode (NO in step S130), the CPU 210 shifts the processing to step S150.

In step S140, the CPU 210 carries out library processing in the stand-alone mode.

In step S150, the CPU 210 carries out library processing in the server-linked mode. The details of the stand-alone mode and the server-linked will be described later. These two operation modes differ in provision source of the library. That is, in the stand-alone mode, the library is transmitted from the information display device 30. In the server-linked mode, the library is transmitted from the management device 10. That is, the previous processing of step S130 is the processing in which the CPU 210 switches the transmission source of the library in accordance with the operation mode.

In step S160, the CPU 210 ends the document management program.

According to this embodiment, the transmission source of the library is switched in accordance with the operation mode of the information display device 30. That is, even when the information processing device 20 cannot communicate with the management device 10 because of trouble in the network or the like, the user can carry out processing such as browsing and editing of the library by setting the operation mode of the information display device 30 to the stand-alone mode in advance. Meanwhile, in the server-linked mode, since the library is shared, plural users can carry out processing such as browsing and editing of the library. Also, since what is communicated between devices is not the content itself but the library, the communication volume and the data volume managed by the management device 10 can be reduced, compared to the configuration in which the content itself is communicated.

2-2. Library Processing in Stand-Alone Mode

Figure 6:
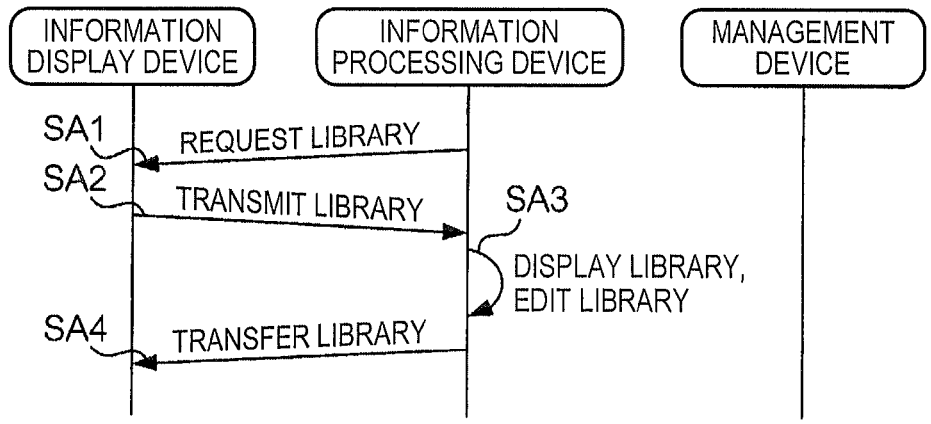
FIG. 6 is a view showing an outline of processing in a stand-alone mode.

FIG. 6 is a view showing an outline of library processing in the stand-alone mode. "Stand-alone mode" refers to an operation mode in which the library stored in the information display device 30 is treated as master data, that is, an operation mode in which the transmission source of the library is the information display device 30. The information processing device 20 requests the library from the information display device 30 (step SA1). The information display device 30 transmits the library to the information processing device 20 in response to the request (step SA2). When the library is received, the information processing device 20 carries out processing such as display of the library and editing of the library (step SA3). The information processing device 20 transmits the library to the information display device 30 when necessary (step SA4).

Figure 7:
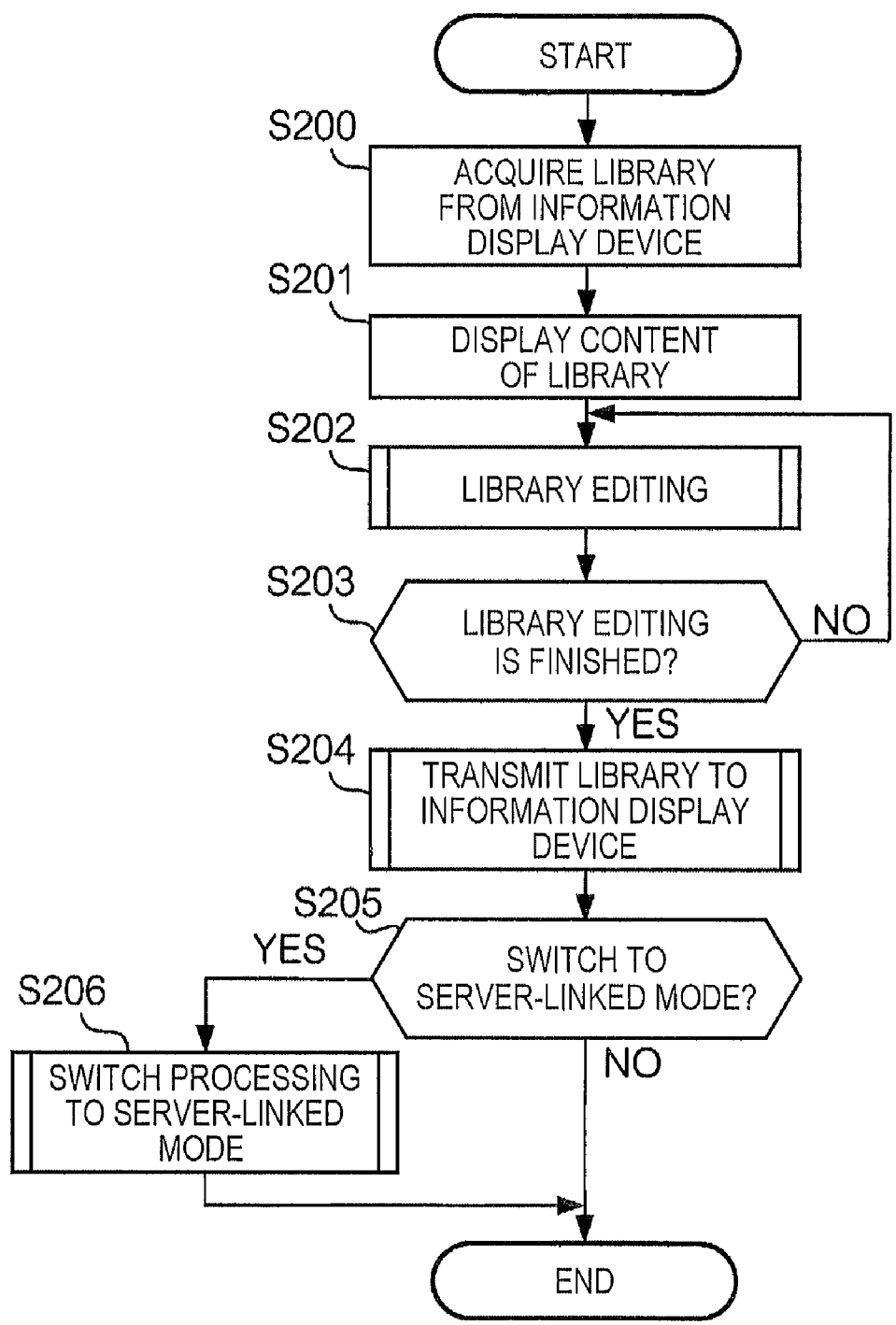
FIG. 7 is a flowchart showing details of processing in the stand-alone mode.

FIG. 7 is a flowchart showing details of library processing in the stand-alone mode. In step S200, the CPU 210 of the information processing device 20 acquires the library from the information display device 30. Specifically, this is done in the following manner. The CPU 210 transmits a message that requests transmission of the library, to the information display device 30. When the message is received, the CPU 310 of the information display device 30 reads out the library from the auxiliary storage device 330. The CPU 310 transmits a response including the read-out library to the information processing device 20. When the response is received, the CPU 210 of the information processing device 20 extracts the library from the response. The library sent from the information display device 30 is described in its unique format. The CPU 210 converts the format of the library from the unique format to the XML format. The CPU 210 stores the XML-formatted library in the auxiliary storage device 230.

In step S201, the CPU 210 causes the display device 240 to display the content of the library.

In step S202, the CPU 210 edits the library. Editing of the library refers to change, deletion, and addition of file subordination information and meta data. Editing of the library is carried out by using a known technique in accordance with an instruction inputted by the user via the input device 250.

In step S203, the CPU 210 determines whether editing of the library is finished or not. If it is determined that editing of the library is not finished (NO in step S203), the CPU 210 repeats the processing until editing is finished. If it is determined that editing of the library is finished (YES in step S203), the CPU 210 shifts the processing to the next step.

In step S204, the CPU 210 transmits the library to the information display device 30. Prior to the transmission of the library, the CPU 210 converts the format of the library from the XML format to the unique format. The CPU 310 of the information display device 30 stores the received library in the auxiliary storage device 330. That is, the library stored in the auxiliary storage device 330 is updated.

In step S205, the CPU 210 of the information processing device 20 determines whether change of the operation mode, that is, change to the server-linked mode is designated or not. If it is determined that change to the server-linked mode is designated (YES in step S205), the CPU 210 shifts the processing to the step S206. If it is determined that change to the server-linked mode is not designated (NO in step S205), the CPU 210 ends the flow of FIG. 7.

In step S206, the CPU 210 carries out switch processing to the server-linked mode. The details of this processing will be described later. After carrying out mode switching, the CPU 210 ends the flow of FIG. 7.

2-3. Library Processing in Server-Linked Mode

Figure 8:
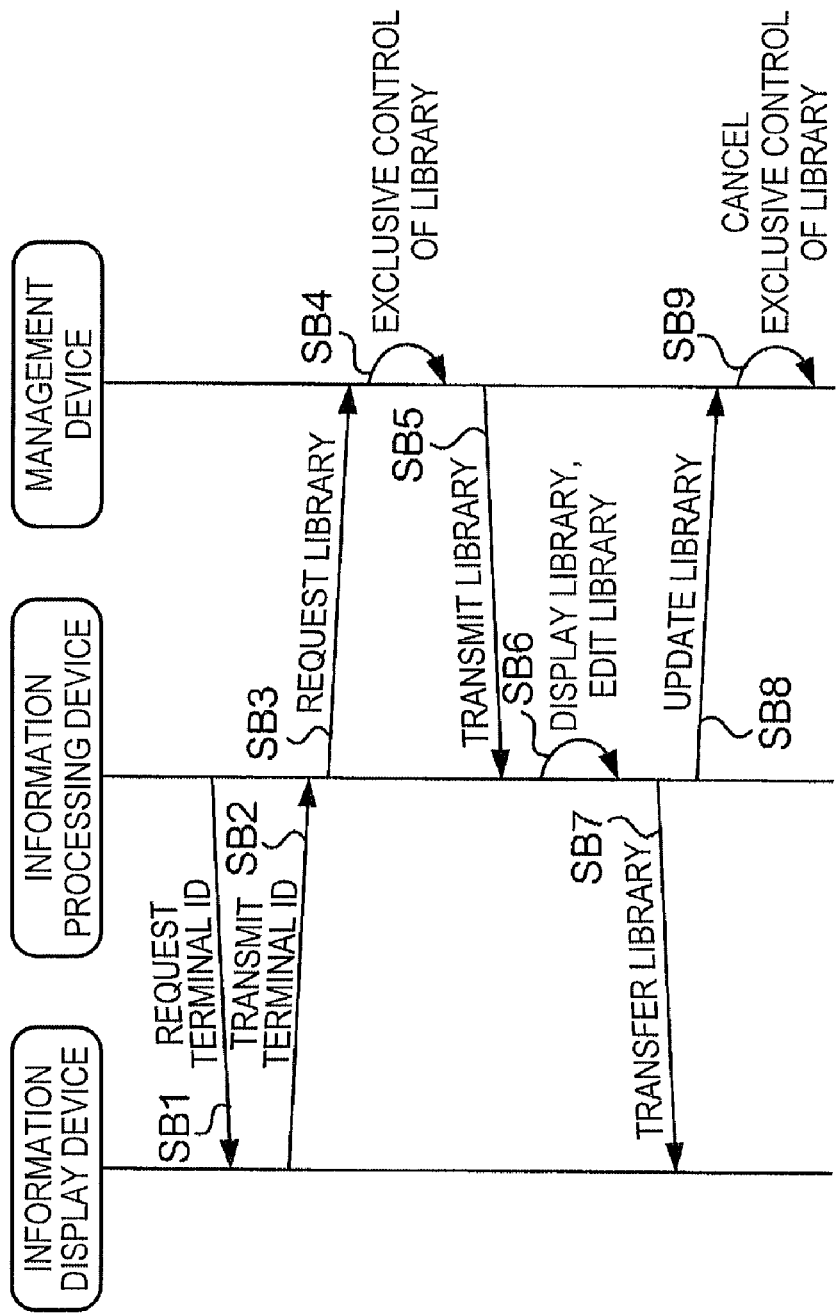
FIG. 8 is a view showing an outline of processing in a server-linked mode.

FIG. 8 is a view showing an outline of library processing in the server-linked mode. "Server-linked mode" is an operation mode in which the library stored in the management device 10 is treated as master data, that is, an operation mode in which the provision source of the library is the management device 10. The management device 10 is specified by the address stored in the auxiliary storage device 230. The information processing device 20 requests transmission of terminal ID from the information display device 30 (step SB1). The information display device 30 transmits the terminal ID to the information processing device 20 in response to the request (step SB2). The information processing device 20 requests the library from the management device 10 (step SB3). The management device carries out exclusive control of the library (step SB4). That is, until the exclusive control is canceled, even if another device tries to access this library, the management device 10 does not accept this request. The management device transmits the library to the information processing device (step SB5). The information processing device 20 carries out processing such as display and editing of the library (step SB6). The information processing device 20 transmits the library to the information display device 30 (step SB7). The information processing device 20 also transmits the library to the management device 10 (step SB8). When the library is received, the management device 10 cancels the exclusive control of the library (step SB9).

Figure 9:
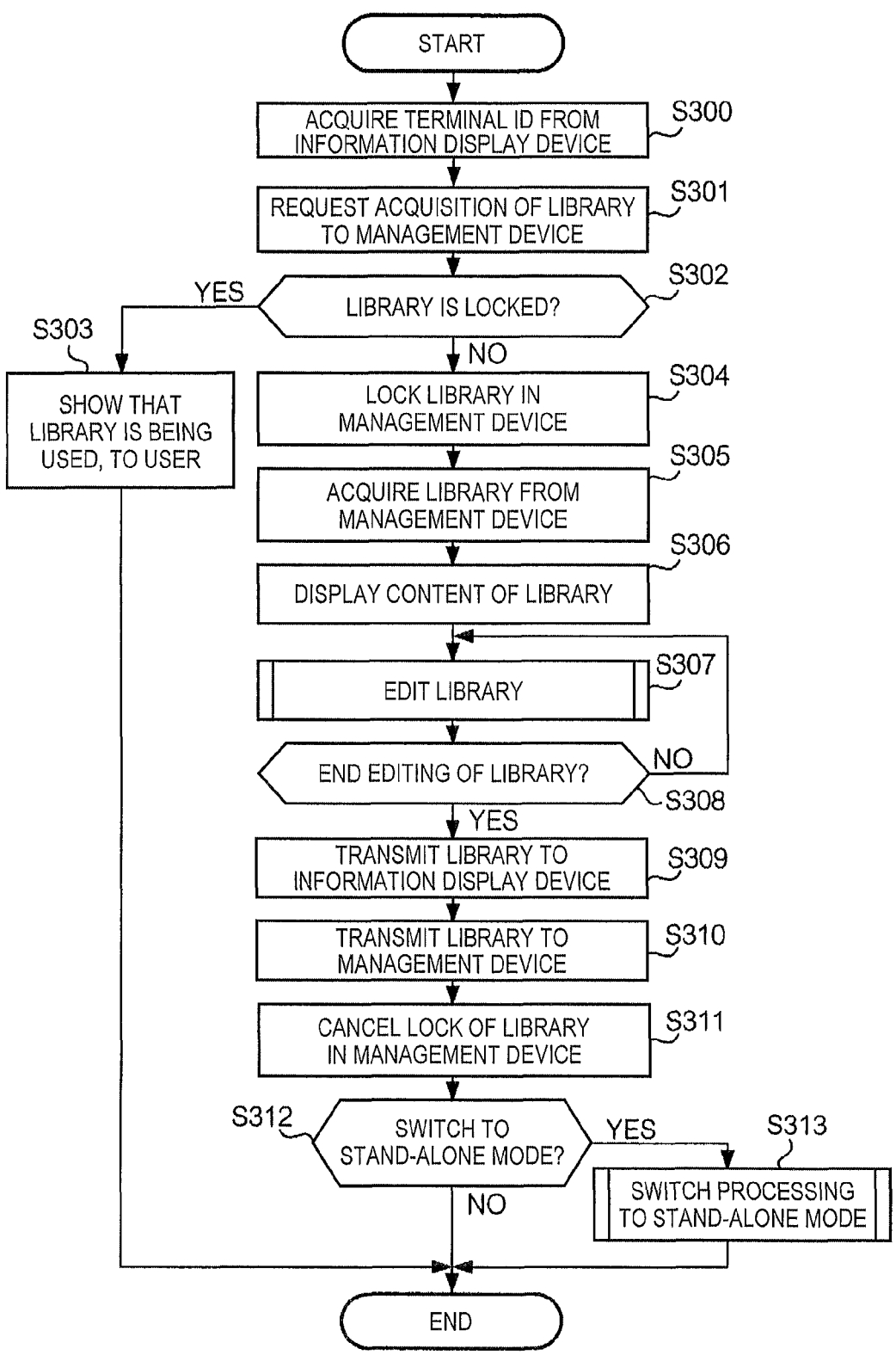
FIG. 9 is a flowchart showing details of processing in the server-linked mode.

FIG. 9 is a flowchart showing an outline of library processing in the server-linked mode. In step S300, the CPU 210 of the information processing device 20 acquires terminal ID from the information display device 30. Specifically, this is done in the following manner. The CPU 210 transmits a message that requests transmission of terminal ID, to the information display device 30. When the message is received, the CPU 310 of the information display device 30 reads out the terminal ID from the auxiliary storage device 330. The CPU 310 transmits a response including the read-out terminal ID to the information processing device 20. When the response is received, the CPU 210 of the information processing device 20 extracts the terminal ID from the response. The CPU 210 stores the extracted terminal ID in the auxiliary storage device 230.

In step S301, the CPU 210 transmits a message that requests transmission of the library, to the management device 10. This message includes the terminal ID of the information display device 30 and the request for transmission of the library corresponding to this terminal ID. The CPU 210 waits until a response to this message is received.

In step S302, the CPU 110 of the management device 10 determines whether the library is locked or not. Specifically, this is done in the following manner. When the message that requests transmission of the library is received, the CPU 110 extracts the terminal ID included in this message. The CPU 110 determines whether the library corresponding to this terminal ID is locked or not, by referring to the database. For the locked library, a flag showing the status is recorded in the database. If it is determined that the library is locked (YES in step S302), the CPU 110 shifts the processing to step S303. If it is determined that the library is not locked (NO in step S302), the CPU 110 shifts the processing to step S304.

In step S303, the user is notified that the library is locked. Specifically, this is done in the following manner. The CPU 110 transmits a message indicating that the requested library is locked, to the information processing device 20. When this message is received, the CPU 210 of the information processing device 20 causes the display unit 240 to display a character string or image showing that the requested library is locked. When the user is notified that the library is locked, the CPU 210 ends the flow of FIG. 9.

In step S304, the CPU 110 of the management device 10 locks the requested library. That is, the database is rewritten so that the flag of the requested library becomes "locked".

In step S305, the CPU 110 transmits a response including the requested library to the information processing device 20. When the response is received, the CPU 210 of the information processing device 20 extracts the library from this response. The library sent from the information display device 30 is described in the database format. The CPU 210 converts the format of the library from the database format to the XML format. The CPU 210 stores the extracted library in the auxiliary storage device 230.

In step S306, the CPU 210 causes the display unit 240 to display the content of the library.

In step S307, the CPU 210 edits the library. Editing of the library refers to change, deletion and addition of file subordination information and meta data. Editing of the library is carried out by using a known technique in accordance with an instruction inputted by the user via the input device 250.

In step S308, the CPU 210 determines whether editing of the library is finished or not. If it is determined that editing of the library is not finished (NO in step S308), the CPU 210 repeats the processing until editing is finished. If it is determined that editing of the library is finished (YES in step S308), the CPU 210 shifts the processing to the next step.

In step S309, the CPU 210 transmits the library to the information display device 30. Prior to the transmission of the library, the CPU 210 converts the format of the library from the XML format to the unique format. The CPU 310 of the information display device 30 stores the received library in the auxiliary storage device 330. That is, the library stored in the auxiliary storage device 330 is updated.

In step S310, the CPU 210 of the information processing device 20 transmits the library to the management device 10. Prior to the transmission of the library, the CPU 210 converts the format of the library from the XML format to the database format. The CPU 110 of the management device 10 stores the received library in the auxiliary storage device 130. That is, the library stored in the auxiliary storage device 130 is updated.

In step S311, the CPU 110 cancels the lock of the updated library.

In step S312, the CPU 210 of the information processing device 20 determines whether change of the operation mode, that is, change to the stand-alone mode is designated or not. If it is determined that change to the stand-alone mode is designated (YES in step S312), the CPU 210 shifts the processing to step S313. If change to the stand-alone mode is not designated (NO in step S312), the CPU 210 ends the flow of FIG. 9.

In step S313, the CPU 210 carries out switch processing to the server-linked mode. The details of this processing will be described later. When the mode is switched, the CPU 210 ends the flow of FIG. 9.

2-4. Switch from Stand-Alone Mode to Server-Linked Mode

Figure 10:
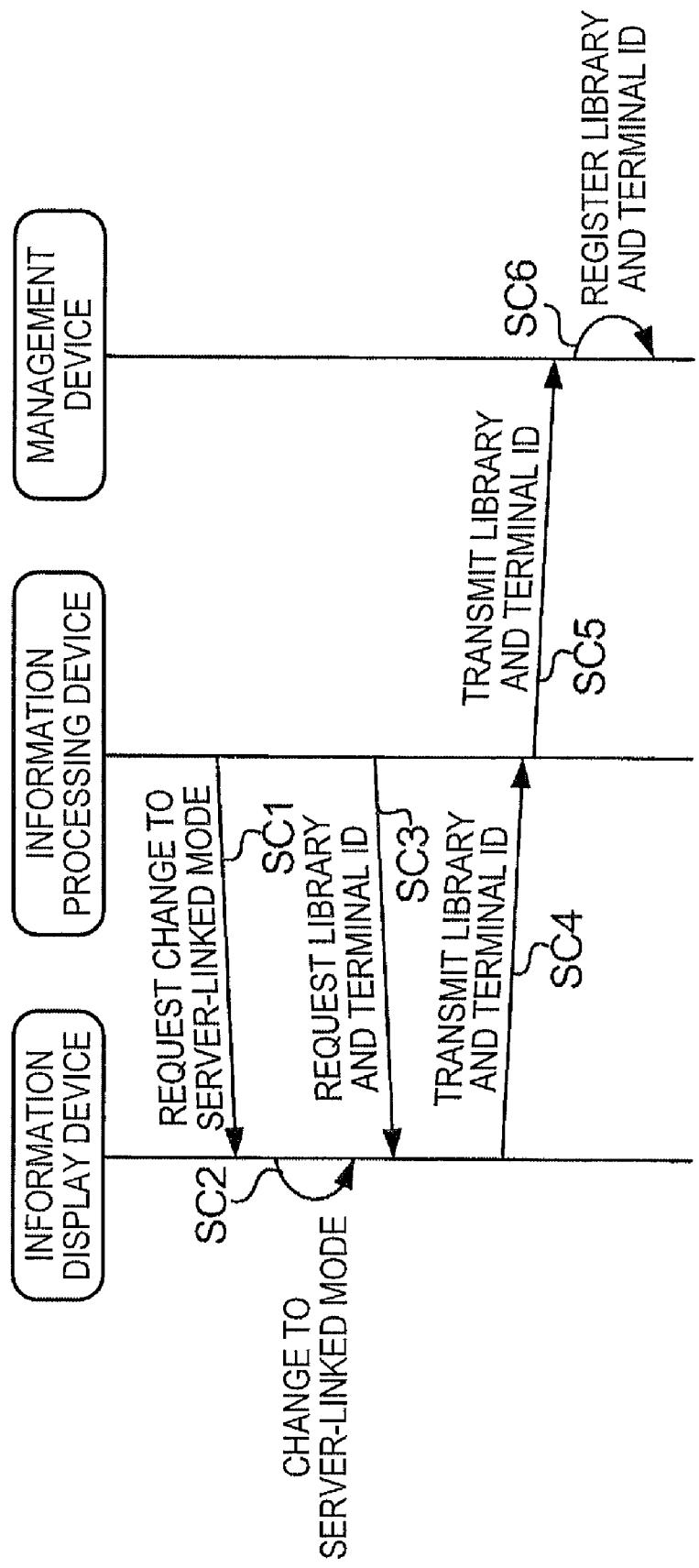
FIG. 10 is a view showing an outline of switch processing to the server-linked mode.

FIG. 10 is a view showing an outline of switch processing to the server-linked mode. The information processing device 20 request the information display device 30 to switch to the server-linked mode (step SC1). The information display device 30 changes its operation mode to the server-linked mode (step SC2). The information processing device 20 requests transmission of the library and the terminal ID from the information display device 30 (step SC3). The information display device 30 transmits the library and the terminal ID to the information processing device 20 (step SC4). The information processing device 20 transmits the library and the terminal ID to the management device 10 (step SC5). The management device 10 registers the library and the terminal ID (step SC6).

Figure 11:
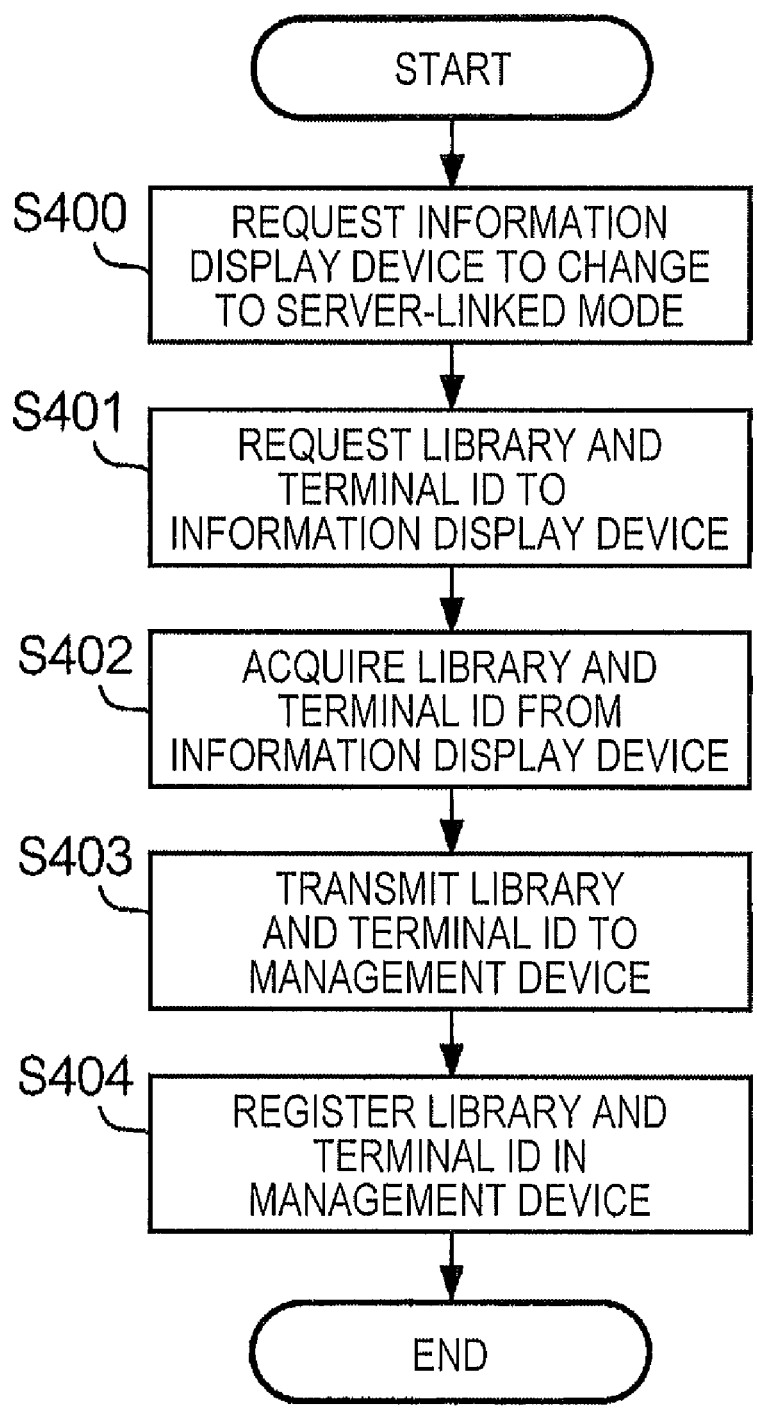
FIG. 11 is a flowchart showing details of switch processing to the server-linked mode.

FIG. 11 is a flowchart showing details of switch processing to the server-linked mode. In step S400, the CPU 210 of the information processing device 20 transmits a message that requests switching to the server-linked mode, to the information display device 30. When this message is received, the CPU 310 of the information display device 30 switches its operation mode to the server-linked mode. That is, the operation mode stored in the auxiliary storage device 330 is switched to the "server-linked mode".

In step S401, the CPU 210 of the information processing device 20 transmits a message that requests transmission of the library and the terminal ID, to the information display device 30. When this message is received, the CPU 310 of the information display device 30 reads out the library and the terminal ID from the auxiliary storage device 330. The CPU 310 transmits a response including the read-out library and terminal ID to the information processing device 20.

In step S402, the CPU 210 of the information processing device 20 acquires the library and the terminal ID. Specifically, this is done in the following manner. The CPU 210 receives the response including the library and the terminal ID. The CPU 210 extracts the library and the terminal ID from this response. The library sent from the information display device 30 is described in the unique format. The CPU 210 converts the format of the library from the unique format to the XML format. The CPU 210 stores the XML-formatted library and the terminal ID in the auxiliary storage device 230.

In step S403, the CPU 210 transmits a message that requests registration of the acquired library and terminal ID, to the management device 10. This message includes the target library and terminal ID.

In step S404, the CPU 110 of the management device 10 registers the library and terminal ID which are requested to be registered, to the database.

2-5. Switch from Server-Linked Mode to Stand-Alone Mode

Figure 12:
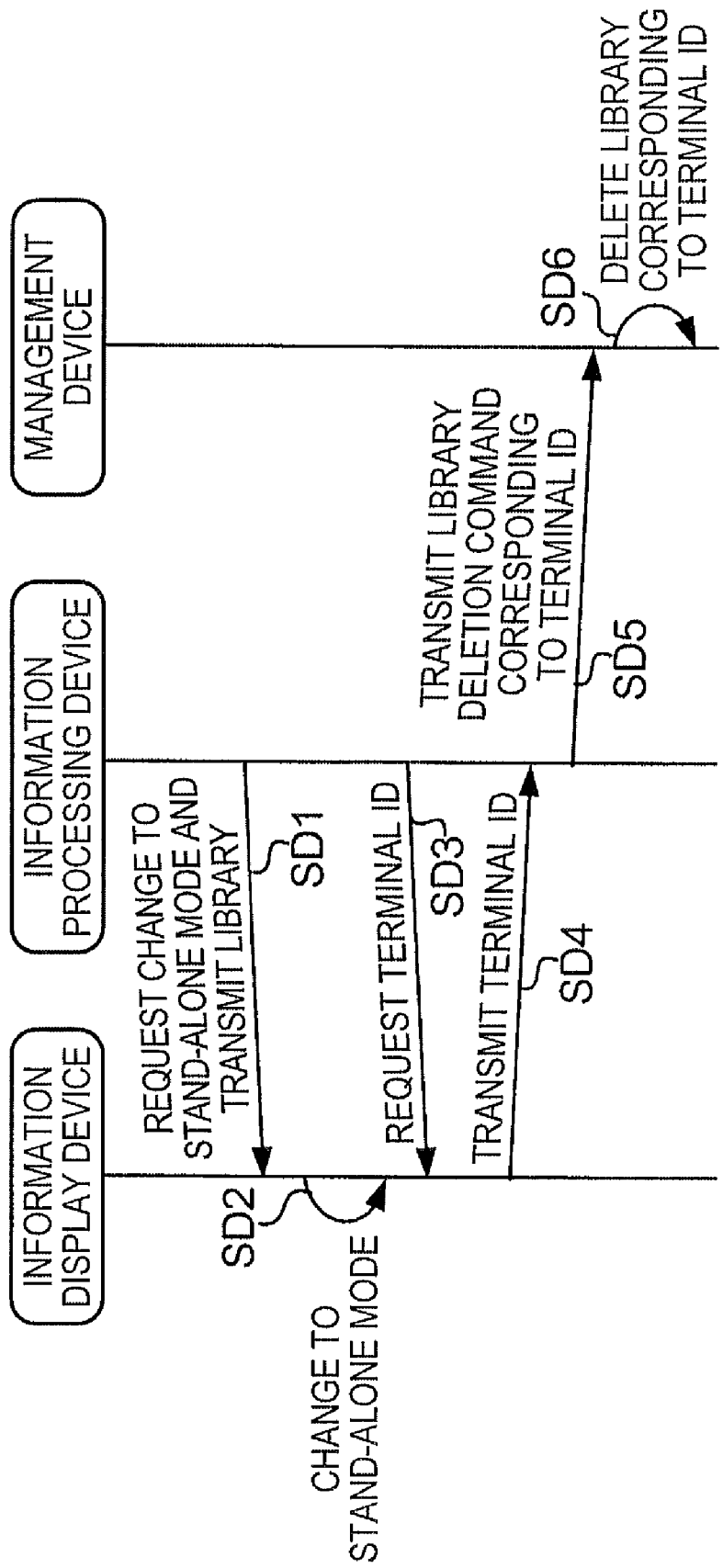
FIG. 12 is a view showing an outline of switch processing to the stand-alone mode.

FIG. 12 is a view showing an outline of switch processing to the stand-alone mode. The information processing device 20 requests the information display device 30 to switch to the stand-alone mode, and at the same time, transmits the library thereto (step SD1). The information display device 30 changes its operation mode to the stand-alone mode (step SD2). The information processing device 20 requests transmission of the terminal ID from the information display device 30 (step SD3). The information display device 30 transmits the terminal ID to the information processing device 20 (step SD4). The information processing device 20 transmits the terminal ID to the management device 10 (step SD5). The management device 10 deletes the library corresponding to this terminal ID from the database (step SD6).

Figure 13:
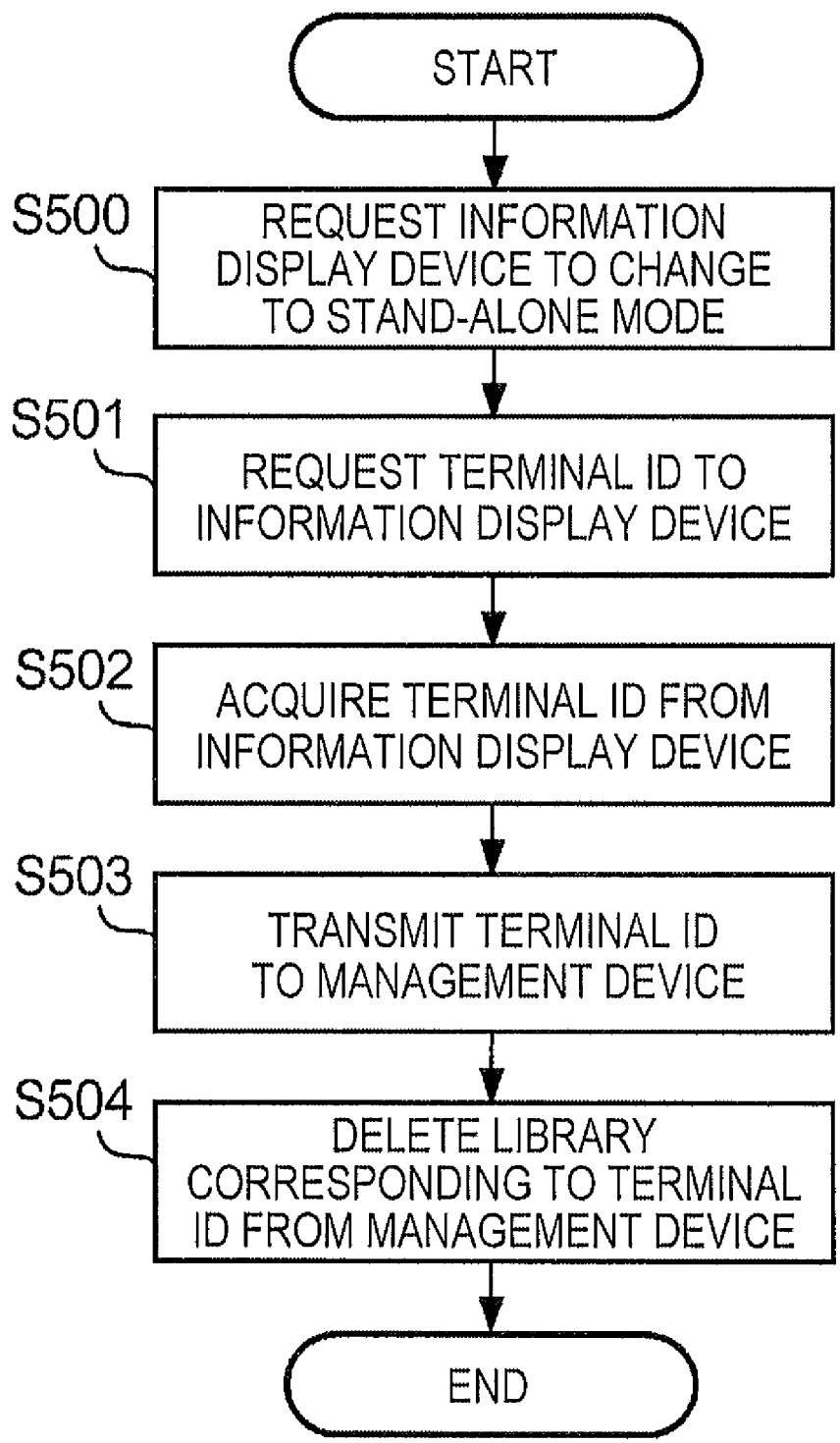
FIG. 13 is a flowchart showing details of switch processing to the stand-alone mode.

FIG. 13 is a flowchart showing an outline of switch processing to the stand-alone mode. In step S500, the CPU 210 of the information processing device 20 transmits a message that requests switching to the stand-alone mode and the library to the information display device 30. When this message is received, the CPU 310 of the information display device 30 switches its operation mode to the stand-alone mode. That is, the operation mode stored in the auxiliary storage device 330 is switched to the "stand-alone". Moreover, the CPU 310 stores the library received at the same time as the message, into the auxiliary storage device 330.

In step S501, the CPU 210 of the information processing device 20 transmits a message that requests transmission of the terminal ID, to the information display device 30. When this message is received, the CPU 310 of the information display device 30 reads out the terminal ID from the auxiliary storage device 330. The CPU 310 transmits a response including the read-out terminal ID to the information processing device 20. In step S502, the CPU 210 of the information processing device 20 receives the response including the terminal ID. The CPU 210 extracts the terminal ID from this response. The CPU stores the extracted terminal ID in the auxiliary storage device 230.

In step S503, the CPU 210 transmits a message that requests deletion of the library corresponding to the acquired terminal ID, to the management device 10. This message includes the target terminal ID.

In step S504, the CPU 110 of the management device 10 deletes the requested library and terminal ID from the database.

In the above embodiment, the information processing device 20 transmits the request to change to the stand-alone mode and the library to the information display device 30 at the same time. However, timing of transmitting the library is not limited to this. The information processing device 20 may transmit the library m simultaneously with the request for the terminal ID (step SD3). Alternatively, the information processing device 20 may transmit the library in separate timing from step SD1 or step SD3.

3. Other Embodiments

The invention is not limited to the above embodiment and various modified embodiments can be made. Hereinafter, several modifications will be described. In the following description, common reference numerals will be used for elements common to the above embodiment. Also, a combination of two or more of the following modifications may be used.

The management device 10 need not be a single device. The information management system 1 may have plural management devices 10. The information processing device 20 stores the address of at least one of these management devices 10. When the information processing device 20 stores the addresses of plural management devices 10, the information processing device 20 may store their priority and the addresses as a set. In this case, the information processing device 20 selects the device of the highest priority as a communication partner. Alternatively, an aggregate of plural devices may have the function of the management device 10 of the embodiment.

The format of the database is not limited to the format described in the embodiment. A library and a terminal ID need not correspond to each other on a one-to-one basis. One terminal ID may correspond to plural libraries. On the contrary, plural terminal IDs may correspond to one library. In short, the database may have any format as long as one terminal ID can specify at least one library.

Although the content itself is not included in the library in the embodiment, the library may include the content itself. Alternatively, the processing described in the embodiment may be carried out on the content itself instead of the library.

A part of the functional configuration of the information processing device 20 shown in FIG. 1 may be omitted. For example, the conversion unit 26 may be omitted. In this case, the management device 10, the information processing device 20 and the information display device 30 process the library in the same format. Alternatively, the editing unit 27 may be omitted. In this case, the information processing device 20 only carries out acquisition, display and transfer of the library, without editing the library.

The information display device 30 is not limited to an electronic paper. A display device without having a memory-type display body may be used. Also, the information display device 30 may have a larger and more complex input device than the input device described in the embodiment, such as a full keyboard.

The hardware configurations of the management device 10, the information processing device 20 and the information display device 30 are not limited to those shown in FIG. 2 to FIG. 4. These devices may have any hardware configuration that can realize the functional configuration of FIG. 1. For example, with respect to the information processing device 20, the CPU 210 has the function of controlling communication via the I/O 260 and the network IF 270 in the embodiment. However, a processor dedicated for communication control may be provided and this processor may control communication. As another example, dedicated processors having the functions of the conversion unit 26 and the editing unit 27 may be provided, and these processors may execute the processing described in the embodiment.

The provision source of mode information is not limited to the information display device 30. The information processing device 20 may acquire the mode information from the management device 10. Although the management device 10 does not store the mode information itself, the terminal ID of the information display device 30 with its operation mode being the server-linked mode, of the plural information display devices 30, is recorded in the database. That is, the management device 10 can provide the mode information by referring to the database. In this case, the information processing device 20 requests the management device 10 to transmit the mode information. Referring to the database, the management device 10 transmits the mode information to the information processing device 20 in accordance with the content of the database. When the information processing device 20 can communicate with both the management device 10 and the information display device 30, the information processing device 20 may acquire the mode information from either one of these devices. When the information processing device 20 can communicate with the management device 10 but cannot communicate with the information display device 30, the information processing device 20 acquires the mode information from the management device 10.

According to the embodiment, in the circumstance where the information display device 30 and the information processing device 20 cannot communicate with each other, change of the operation mode cannot be completed. In this case, the information processing device 20 proceeds with the processing up to where it is possible without the information display device 30, and reserves the remaining part of the processing. When it is detected that communication with the information display device 30 is possible, the information processing device 20 executes the reserved processing.

The method of acquiring the terminal ID of the information display device 30 is not limited to the method described in the embodiment. The terminal ID may be inputted by the user operating the input device 250. Alternatively, the terminal ID may be transmitted from the information display device 30 to the information processing device 20, triggered by the establishment of connection between the information processing device 20 and the information display device 30. In the examples of FIG. 8, FIG. 10 and FIG. 12, the terminal ID is acquired for every processing. However, the terminal ID need not be acquired for every processing in this manner. That is, the terminal ID need not be acquired for every processing if the terminal ID is acquired when the information processing device 20 and the information display device 30 become connected to each other.

The address of the management device 10 may be acquired from the information display device 30. In this case, the information processing device 20 does not store the address of the management device 10 in advance. When the information processing device 20 and the information display device 30 become connected to each other, the information processing device 20 acquires the address of the management device 10 from the information display device 30. This configuration is particularly effective in the case where plural management devices 10 exist.

When the mode is switched from the server-linked mode to the stand-alone mode, the library need not be deleted from the database. In this case, the management device 10 stores the library and a flag indicating that the library is unavailable, as a set. The management device 10 cannot use the library with its flag indicating "unavailable".

A supplementary explanation will be given with respect to library transfer (step SA4 and step SB7) after library editing in FIG. 6 and FIG. 8 (step SA3 and step SB6). The library is information used for management of the content. The library is used for provision of information of the target content to be edited by the information processing device 20. The library is also used for display of content-related information by the information display device 30, for example, display of a list of contents. In the above embodiment, the library is converted to the unique format before being transmitted to the information display device 30. Whether the operation mode of the information display device 30 is the server-linked mode or the stand-alone mode, the library edited by the information processing device 20 is sent to the information display device 30. The information display device 30 acquires the edited library.

If the library before editing is stored in the information display device 30, the information display device 30 rewrites (updates) the library. Rewriting is carried out every time the information display device 30 becomes connected to the information processing device 20 and synchronization is triggered. In rewriting, the information display device 30 rewrites the entire library. Specifically, this is done in the following manner. The information display device 30 deletes the library before editing, stored in the auxiliary storage device 330. When the library before editing is deleted, the information processing device 20 transmits the edited library to the information display device 30. When the edited library is received, the information display device 30 stores the received library in the auxiliary storage device 330.

Alternatively, the information display device 30 may rewrite a part of the library instead of rewriting the entire library. That is, the information display device 30 may carry out differential rewriting of the library. Specifically, this is done in the following manner. The information processing device 20 stores update information of the library, that is, information indicating the difference between the library before editing and the library after editing, in the auxiliary storage device 230 or the RAM 220. The information processing device 20 transmits the update information to the information display device 30. When the update information is received, the information display device 30 updates the library stored in the auxiliary storage device 330 in accordance with the update information.

The partial rewriting (differential update) of the library as described above may be applied to transmission and reception of the library between the information processing device 20 and the information display device 30 in the change processing (FIG. 12 and FIG. 13) from the server-linked mode to the stand-alone mode. Particularly, when editing of the library is not carried out in the information processing device 20, the information processing device 20 stores information indicating that the library is not edited. In this case, the information processing device 20 transmits this information to the information display device 30, instead of transmitting the library. Thus, transfer of the library itself is omitted.

In FIG. 10 and FIG. 11, when the operation mode is switched from the stand-alone mode to the server-linked mode, processing of the library stored in the information display device 30 is not particularly described. However, the information display device 30 may delete the library. This is particularly useful in the case where the information display device 30 does not use the library to display a list of contents. In this case, the information display device 30 stores the content itself in the auxiliary storage device 330 and displays a list by searching the content itself.

In this case, the information display device 30 confirms that the library is registered in the database of the management device 10, and then deletes the library. Alternatively, the information display device 30 may keep the library stored therein. Moreover, in this case, the information display device 30 may store the library as it is or may store the library with a flag indicating that the library is unavailable, as a set. In the case of storing the flag, the information display device 30 rewrites the value of the flag every time the operation mode is switched.

The above partial rewriting (differential update) of the library may also be applied to transmission and reception of the library between the management device 10 and the information processing device 20 when the operation mode is switched to the server-linked mode. In this case, at the time of switching to the stand-alone mode, the management device stores a flag indicating "unavailable" instead of deleting the library as shown in FIG. 12 and FIG. 13 (step SD6 and step S504). The management device carries out differential update and changes the flag to "available".

The programs stored and executed by the management device 10, the information processing device 20 and the information display device 30 may be provided in the state of being recorded on a recording medium such as magnetic tape, magnetic disk, flexible disk, optical recording medium, magneto-optical recording medium, CD (Compact Disk), DVD (Digital Versatile Disk), or flash ROM (Read Only Memory).

The entire disclosure of Japanese Patent Application Nos. 2007-244902 filed on Sep. 21, 2007 and 2008-230610 filed on Sep. 9, 2008 are expressly incorporated by reference herein.

What is claimed is:

1. An information processing device comprising:
   a first interface used for communication via a network;
   a second interface used for communication with an information display device;

an identifier acquisition unit that acquires an identifier specifying the information display device;

an address storage unit that stores an address indicating location of a management device on the network;

a mode information acquisition unit that acquires mode information indicating whether an operation mode of the information display device specified by the identifier acquired by the identifier acquisition unit is a server-linked mode or a stand-alone mode;

a first transmission unit that transmits a request including a request to transmit management information specifying a content displayed in the information display device and the identifier, to the management device via the first interface when the mode information indicates the server-linked mode;

a first receiving unit that receives the management information transmitted from the management device in response to the request transmitted by the first transmission unit, via the first interface;

a second transmission unit that transmits a request to transmit the management information, to the information display device via the second interface when the mode information indicates the stand-alone mode; and a second receiving unit that receives the management information transmitted from the information display device in response to the request transmitted by the second transmission unit, via the second interface.

2. The information processing device according to claim 1, comprising:

a third transmission unit that transmits a request to change the operation mode of the information display device to the server-linked mode, to the information display device via the second interface;

a third receiving unit that receives a response including the management information transmitted from the information display device in response to the request transmitted by the third transmission unit, via the second interface; and a fourth transmission unit that transmits the management information included in the response received by the third receiving unit and the identifier to the management device via the first interface.

3. The information processing device according to claim 1, comprising:

a fifth transmission unit that transmits a request to change the operation mode of the information display device to the stand-alone mode to the information display device via the second interface; and a sixth transmission unit that transmits the identifier to the management device via the first interface.

4. The information processing device according to claim 1, wherein the mode information acquisition unit acquires the mode information from the information display device or the management device when communication with the information display device is possible, and the mode information acquisition unit acquires the mode information from the management device when communication with the information display device is not possible.

5. The information processing device according to claim 1, comprising:

an editing unit that edits the management information;

a seventh transmission unit that transmits the management information edited by the editing unit to the management device via the first interface when the mode information indicates the server-linked mode; and an eighth transmission unit that transmits the management information edited by the editing unit to the information display device via the second interface when the mode information indicates the server-linked mode or when the mode information indicates the stand-alone mode.

6. The information processing device according to claim 1, wherein the management device, the information processing device and the information display device process the management information in different formats from each other, and the information processing device has a conversion unit that converts the format of the management information in accordance with a transmission destination before transmitting the management information to the management device or the information display device.

7. An information processing method in an information processing device including:

a first interface used for communication via a network;

a second interface used for communication with an information display device; and an address storage unit that stores an address indicating location of a management device on the network, the method comprising:

acquiring an identifier specifying the information display device;

storing an address indicating location of the management device on the network into the storage unit;

acquiring mode information indicating whether an operation mode of the information display device specified by the identifier is a server-linked mode or a stand-alone mode;

transmitting a first request including a request to transmit management information specifying a content displayed in the information display device and the identifier, to the management device via the first interface when the mode information indicates the server-linked mode;

receiving the management information transmitted from the management device in response to the first request, via the first interface;

transmitting a second request to transmit the management information, to the information display device via the second interface when the mode information indicates the stand-alone mode; and receiving the management information transmitted from the information display device in response to the second request, via the second interface.

8. The information processing method according to claim 7, wherein in the acquisition of the mode information, the mode information is acquired from the information display device or the management device when communication with the information display device is possible, and the mode information is acquired from the management device when communication with the information display device is not possible.

9. An information management system comprising:

a management device;

plural information processing devices capable of communicating with the management device via a network; and plural information display devices, each of the plural information processing devices comprising:

a first interface used for communication via the network;

a second interface used for communication with the information display devices;

an identifier acquisition unit that acquires an identifier specifying a target information display device to be a communication target, of the plural information display devices;

an address storage unit that stores an address indicating location of a management device on the network;

a mode information acquisition unit that acquires mode information indicating whether an operation mode of the target information display device is a server-linked mode or a stand-alone mode;

a first transmission unit that transmits a request including a request to transmit management information specifying a content displayed in the target information display device and the identifier, to the management device via the first interface when the mode information indicates the server-linked mode;

a first receiving unit that receives the management information transmitted from the management device in response to the request transmitted by the first transmission unit, via the first interface;

a second transmission unit that transmits a request to transmit the management information, to the target information display device via the second interface when the mode information indicates the stand-alone mode;

a second receiving unit that receives the management information transmitted from the target information display device in response to the request transmitted by the second transmission unit, via the second interface;

a fifth transmission unit that transmits a request to change the operation mode of the target information display device to the stand-alone mode to the target information display device via the second interface; and a sixth transmission unit that transmits the identifier to the management device via the first interface, the management device comprising:

a database in which plural data sets are stored including an identifier specifying one information display device of the plural information display devices and management information corresponding to the one information display device;

a fourth receiving unit that receives the identifier transmitted by the sixth transmission unit; and a use suspension unit that disables use of management information corresponding to the identifier received by the fourth receiving unit.

10. The information management system according to claim 9, wherein the mode information acquisition unit acquires the mode information from the information display device or the management device when communication with the information display device is possible, and the mode information acquisition unit acquires the mode information from the management device when communication with the information display device is not possible.

* * * * *